US012770196B2

(12) United States Patent
Birgenheier

(10) Patent No.: US 12,770,196 B2
(45) **Date of Patent: *Oct. 20, 2026**

(54) COMPUTING SYSTEMS AND METHODS FOR MULTI-PARTY TRANSACTIONS

(71) Applicant: Wells Fargo Bank, N.A., San Francisco, CA (US)

(72) Inventor: Jason Robert Birgenheier, Las Vegas, NV (US)

(73) Assignee: Wells Fargo Bank, N.A., San Francisco, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 18/736,938

(22) Filed: Jun. 7, 2024

(65) Prior Publication Data

US 2024/0320757 A1 Sep. 26, 2024

Related U.S. Application Data

(63) Continuation of application No. 18/050,678, filed on Oct. 28, 2022, now Pat. No. 12,033,220, which is a continuation of application No. 16/351,049, filed on Mar. 12, 2019, now Pat. No. 11,488,251.

(60) Provisional application No. 62/642,980, filed on Mar. 14, 2018.

(51) Int. Cl.
*G06Q 40/08* (2012.01)
*G06Q 20/08* (2012.01)

(52) U.S. Cl.
CPC ........... *G06Q 40/08* (2013.01); *G06Q 20/085* (2013.01)

(58) Field of Classification Search
CPC ..................................................... G06Q 20/085
See application file for complete search history.

(56) References Cited

U.S. PATENT DOCUMENTS 11,488,251 B1 11/2022 Birgenheier
2007/0033070 A1* 2/2007 Beck .................... G06Q 20/102 705/40
2008/0091528 A1* 4/2008 Rampell ............ G06Q 30/0633 705/14.1

(Continued)

OTHER PUBLICATIONS

"U.S. Appl. No. 16/351,049, Examiner Interview Summary mailed Sep. 21, 2021", 3 pgs.

(Continued)

*Primary Examiner* — Edward Chang
(74) *Attorney, Agent, or Firm* — SCHWEGMAN LUNDBERG & WOESSNER, P.A.

(57) ABSTRACT

Various examples described herein are directed to systems and methods for managing multi-party transactions. A payment management system may receive a premium payment message from a user computing device. The premium payment message may describe a premium payment towards a health insurance policy held by a user of the user computing device. The payment management system may initiate a deposit of the premium payment to a premium account associated with the user. The payment management system may also receive a payment instruction from a payer system of a payer associated with the health insurance policy. The payment management system may select a first patient payment source and initiate a transfer of a payment amount to a provider.

20 Claims, 9 Drawing Sheets

(56) References Cited

U.S. PATENT DOCUMENTS

| | | | | |
|---|---|---|---|---|
| 2011/0213625 | A1* | 9/2011 | Joao | G06F 16/9535<br>705/2 |
| 2014/0081667 | A1* | 3/2014 | Joao | G16H 40/63<br>705/3 |
| 2014/0350959 | A1* | 11/2014 | Bogle | G06Q 40/08<br>705/2 |
| 2017/0177808 | A1* | 6/2017 | Irwin | G06Q 10/10 |
| 2017/0178093 | A1* | 6/2017 | Bull | G06Q 20/10 |
| 2019/0188798 | A1* | 6/2019 | Foreman | G06Q 40/08 |

OTHER PUBLICATIONS

"U.S. Appl. No. 16/351,049, Final Office Action mailed Jul. 12, 2021".
"U.S. Appl. No. 16/351,049, Non Final Office Action mailed Jan. 27, 2022".
"U.S. Appl. No. 16/351,049, Non Final Office Action mailed Dec. 1, 2020".
"U.S. Appl. No. 16/351,049, Notice of Allowance mailed Jun. 29, 2022".
"U.S. Appl. No. 16/351,049, Response filed Mar. 1, 2021 to Non Final Office Action mailed Dec. 1, 2020", 16 pgs.
"U.S. Appl. No. 16/351,049, Response filed Apr. 27, 2022 to Non Final Office Action mailed Jan. 27, 2022", 15 pgs.
"U.S. Appl. No. 16/351,049, Response filed Oct. 12, 2021 to Final Office Action mailed Jul. 12, 2021", 15 pgs.
"U.S. Appl. No. 18/050,678, Notice of Allowance mailed Mar. 6, 2024", 9 pgs.

* cited by examiner

COMPUTING SYSTEMS AND METHODS FOR MULTI-PARTY TRANSACTIONS

CROSS-REFERENCE TO RELATED APPLICATION

This patent application is a continuation of U.S. patent application Ser. No. 18/050,678, filed Oct. 28, 2022, which is a continuation of U.S. patent application Ser. No. 16/351,049, filed Mar. 12, 2019, now issued as U.S. Pat. No. 11,488,251, which claims the benefit of U.S. Provisional Patent Application No. 62/642,980, filed Mar. 14, 2018, each of which are incorporated by reference herein in their entirety.

TECHNICAL FIELD

Embodiments described herein generally relate to particular systems and methods for managing a computing device or system of computing devices to quickly and efficiently perform computing tasks.

BACKGROUND

Computing devices and systems are capable of processing large quantities of data quickly, including data regarding health insurance transactions. For example, health care providers issue electronic claim data to payers (e.g., insurance companies) for goods and services provided. Payers determine their responsibility and/or the responsibility of patient users for the health care goods and services and provide electronic data to the providers and/or to the patient users indicating the responsibilities of the payers and the patient users, as well as, in some examples, providing payment to the providers.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
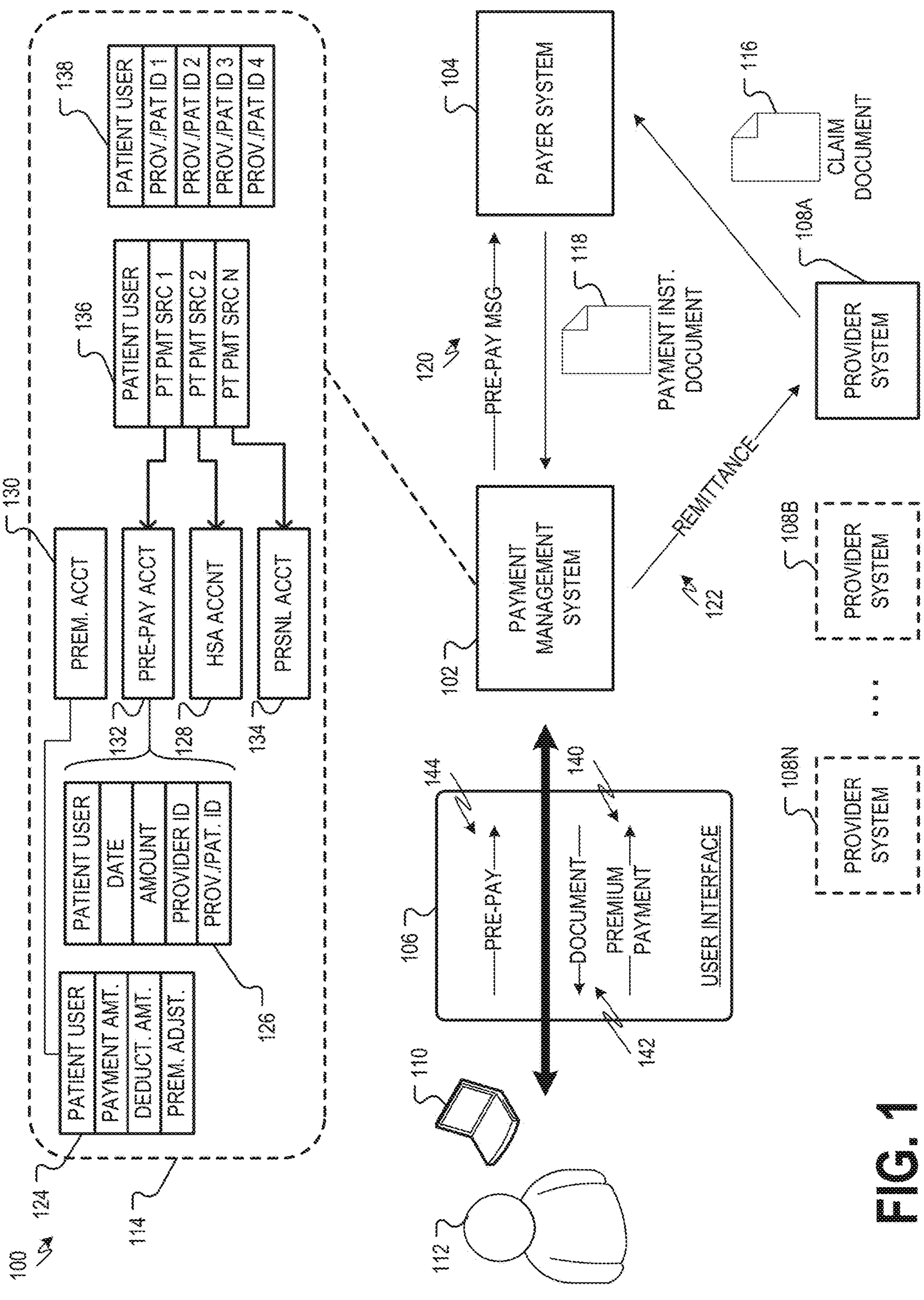
FIG. 1 is a diagram showing one example of an environment for facilitating multi-party transactions.

Various examples are directed to computing systems and methods for facilitating multi-party transactions, such as health care payment transactions. Health care payment transactions include a health care provider, referred to herein as a provider; a patient user; and, often, a third-party payer, referred to herein as a payer. The provider is a medical practice, pharmacy, or other provider that provides health care goods and/or services to the patient user. The patient user is a user associated with a patient who receives health care goods and/or services. For example, the patient use may be the patient him or herself or another person associated with the patient such as, for example, a parent or guardian, etc. The payer is an insurance company, health plan, or other third-party payer who provides payment for some or all of the health care goods and/or services provided to the patient user, for example, according to the terms of a policy.

When the provider provides health care goods and/or services to the patient user, the provider typically sends a claim to the payer indicating the price for the services. The payer adjudicates the claim to determine a patient user responsibility indicating a portion of a payment amount to the provider that is to be covered by the patient user and/or a payer responsibility indicating a portion of the payment amount that is to be covered by the payer. The payment amount may be equal to the price indicated by the provider or different (e.g., lower) than the price indicated by the provider. In some examples, the payer provides the payer responsibility portion to the provider and the provider bills the patient user for the patient user responsibility portion. This arrangement, however, incorporates various inefficiencies. For example, the patient user is typically not billed until the payer completes adjustment of the claim, lengthening the billing cycle for the provider. Also, the provider is responsible for collecting the patient user responsibility portion, which creates administrative overhead and credit risk for the provider.

Various examples described herein are directed to a payment management system having a unique technical arrangement that facilitates an improved billing cycle for multi-party payments, such as health care payments. The payment management system manages one or more databases including various tables for processing multi-party transactions. The payment management system serves a user interface to a patient user. The user interface includes a premium payment routine. The premium payment routine executes, for example, at the payment management system and/or at a patient user device to facilitate a payment towards a premium, for example, a premium of a health insurance policy held by the patient user. Premium payments made by or on behalf of the patient user, in some examples, are kept and/or described at a premium account associated with the patient user and may be used to cover the payer responsibility portion of a payment to a provider, as described herein.

The patient user consumes health care goods and/or services from a provider. A provider computing system, referred to herein as a provider system, sends claim data to a payer system associated with a payer (e.g., the party that wrote the health insurance policy held by the patient user).

The claim data describes the goods and/or services provided to the patient user and a payment amount to compensate the provider for the goods and/or services provided. The payer system receives the claim data and adjudicates the claim. For example, the payer system determines a first portion of the payment amount that is the responsibility of the payer and a second portion of the payment amount that is the responsibility of the patient user. (In some examples, the payer system also adjusts the payment amount, for example, per an agreement between the payer and the provider.) The payer system sends a payment instruction to the payment management system. The payment instruction indicates the payment amount, the first portion of the payment amount to be covered by the patient user, and the second portion of the payment amount to be covered by the payer. The first portion covered by the patient user can be covered out of the pocket of the patient user and/or by another insurance policy such as, for example, a property/casualty policy.

The payment management system accesses a patient payment record stored at a memory of the payment management system. The patient payment record describes a hierarchy of patient payment sources. Patient payment sources include sources of funds that the patient user can use to pay the first portion of the payment amount to be covered by the patient user. Example patient payment sources include a Health Savings Account (HSA account); a prepayment account including prepayments made by the patient user; one or more personal accounts, such as checking accounts, savings accounts, or credit accounts; etc. The payment management system selects a first patient payment source from the hierarchy of patient payment sources.

The payment management system initiates a transfer of the payment amount to a provider account. If the patient user is responsible for any portion of the payment amount, that portion is transferred from the first patient payment source. If the payer is responsible for any portion of the payment amount, that portion is transferred from the premium account.

FIG. 1 is a diagram showing one example of an environment 100 for facilitating multi-party transactions. The environment 100 comprises a payment management system 102, a payer system 104, one or more provider systems 108A, 108B, 108N, and a user computing device 110. The payment management system 102 processes various messages and makes various payments to facilitate multi-party transactions. The payment management system 102 is implemented by a financial services company or other entity that facilitates multi-party transactions, as described herein. The payment management system 102 may be or include any suitable type of computing device, including, for example, one or more servers. Computing devices making up the payment management system 102 may be at a common geographic location or distributed across multiple geographic locations. The payment management system 102 maintains a database 114 that is used, as described herein, to facilitate multi-party transactions.

The payer system 104 is associated with the payer, such as a health insurance company. The payer system 104 receives and processes claims. The payer system 104 may include one or more computing devices such as, for example, one or more servers. Computing devices making up the payer system 104 may be at a common geographic location or distributed across multiple geographic locations.

The one or more provider systems 108A, 108B, 108N are maintained by providers who provide health care goods and/or services. The provider systems 108A, 108B, 108N may include one or more computing devices such as, for example, one or more servers. Computing devices making up a provider system 108A, 108B, 108N may be at a common geographic location or distributed across multiple geographic locations.

The user computing device 110 provides a user interface (UI) 106 to a user 112. The user 112 may be a patient user or, in some examples, another party that pays a premium and/or prepayment on behalf of a patient user, such as an employer. The UI 106 allows the user 112 to make payments, as described herein, and receive information describing various multi-party transactions. The user computing device 110 may be or include any suitable computing device or devices such as, for example, a smart phone, a tablet computer, a laptop computer, a smart watch, etc. The user computing device 110 comprises input/output (I/O) devices for providing the UI 106 to the user 112. For example, the user computing device 110 comprises a display for showing the UI 106 to the user 112. In some examples, the user computing device 110 executes an application that facilitates the provision of the UI 106. For example, the user computing device 110 may execute a web browser that communicates with the payment management system 102 to receive and display the UI 106. For example, the UI 106 may be or include a web page displayed at the user computing device 110 via the web browser. Also, in some examples, the user computing device 110 executes an application that otherwise communicates with the payment management system 102. For example, the application may be or include a mobile or other application that includes an embedded web view or other view that receives a web document from the payment management system 102.

The UI 106 provides various functionality to the user 112 and the payment management system 102. For example, the UI 106 may include a premium payment routine 140. The premium payment routine 140 executes at the user computing device 110 and/or at the payment management system 102. The premium payment routine 140 receives premium payments from the user 112. Premium payments are periodic payments from the user 112 to the payer in conjunction with a health insurance policy held by the user 112. The premium payment routine 140 may prompt the user 112 to provide premium payments periodically. For example, the premium payment routine 140 may periodically send a premium payment notice indicating that the user 112 should provide a premium payment. The amount of the prompted premium payment may be a scheduled premium payment amount indicated by the policy and/or may include an adjustment as described herein.

The user 112 provides the premium payments through the UI 106, for example, by providing a premium payment message including credit card, checking account, or other payment data. In other examples, the premium payment routine 140 automatically deducts premium payments from an account of the user 112. The payment management system 102 initiates a deposit of premium payments into a premium account associated with the user 112. For example, premium payments stored at the premium account may be used to cover some or all of the payer responsibility portion of a claim, as described herein.

In some examples, the UI 106 also includes a prepayment routine 144. The prepayment routine 144 executes at the user computing device 110 and/or at the payment management system 102. The prepayment routine 144 receives prepayments from the user 112 for health care goods and/or services provided by a provider. The user 112 provides the prepayments through the UI 106, for example, by providing a prepayment message indicating credit card, checking account, or other payment data. In other examples, the prepayment routine 144 automatically deducts prepayments from an account of the user 112. The user 112 makes a prepayment before a remittance 122 is provided to the provider system 108A (e.g., by initiating a transfer to a provider account). The prepayment may be made before or after the user 112 receives health care goods or services from a provider.

In some examples, the provider prompts the user 112 to make a prepayment using the prepayment routine 144 at or about the time that health care goods or services are provided. In some examples, the prepayment routine 144 is configured to prompt the user 112 to make a prepayment. For example, the prepayment routine 144 may access a Global Positioning System (GPS) sensor or other location sensor system at the user computing device 110. If the prepayment routine 144 determines that the user 112 is located at the facility of a health care provider, it may prompt the user 112 to make a prepayment. Pre-payments received are stored at a prepayment account associated with the user 112 and may be used, as described herein, to cover some or all of the patient responsibility portion of the payment amount to the provider. Upon receiving a prepayment, in some examples, the prepayment routine 144 is configured to send, or prompt the payment management system 102 to send, a prepayment message 120 to the payer system 104. The prepayment message 120 indicates an amount of the prepayment, an identification of the user 112 (e.g., a policy number), and an identifier of the provider (e.g., a provider serial number or other identifier). The payer system 104 may use the data indicated by the prepayment message 120 when adjusting a claim from the provider system 108A, as described herein.

The UI 106, in some examples, also includes a document routine 142. The document routine 142 provides the user 112 with access to documents related to multi-party transactions. For example, the document routine 142 may provide the user 112 with access to an Explanation of Benefits (EOB) document describing the payment amount, the payer responsibility portion, and the patient responsibility portion. For example, the document routine 142 may be configured to display a Portable Document Format (PDF) or other format of document to the user 112, for example, at a display of the user computing device 110.

The user 112 (or another person covered under the same policy as the user 112) receives health care goods and/or services from a provider associated with the provider system 108A. The provider system 108A generates a claim document 116. The claim document 116 describes the patient (who may be the user 112), as well as the health care goods and/or services provided, along with a proposed payment amount. In some examples, the claim document 116 is arranged according to the EDI 837 format. Other provider systems 108B, 108N may similarly generate claim documents, similar to the claim document 116, to describe claims related to health care goods and/or services provided by their associated providers. The provider system 108A sends the claim document 116 to the payer system 104.

The payer system 104 receives the claim document 116 and adjudicates the claim. To adjudicate the claim, the payer system 104 determines a payment amount owed to the provider, a patient responsibility portion of the payment amount, and a payer responsibility portion of the payment amount. The payment amount may be the same as the proposed payment amount indicated by the provider system 108A in the claim document 116 or different. For example, the payer system 104 may adjust the payment amount down based on a previous agreement between the provider and the payer. The patient responsibility portion of the payment amount describes the portion of the payment amount that is to be paid by the user 112. The payer responsibility portion of the payment amount describes the portion of the payment amount that is to be paid by the payer. The payer and patient responsibility portions of the payment amount may be determined based on various criteria of the user's policy, such as deductibles, co-pay amounts, coinsurance, etc.

Upon determining the patient responsibility portion and the payer responsibility portion, the payer system 104 sends a payment instruction document 118 to the payment management system 102. In some examples, the payment instruction document 118 is arranged according to the EDI 835 format. The payment management system 102 directs a remittance 122 for the payment amount to the provider system 108A, for example, by initiating a transfer of the payment amount to an account of the provider associated with the provider system 108A. In some examples, the payment instruction document 118 also includes EOB data to be provided to the user 112. Also, in some examples, the payer system 104 matches the claim document 116 to a prepayment message 120 provided by the payment management system 102 to identify a prepayment made by the user 112 in conjunction with the goods or services covered by the claim document 116. If a corresponding prepayment message 120 is found, the payer system 104 may indicate the prepayment described by the prepayment message 120 at the payment instruction document 118.

The payment management system 102 is programmed to fund the remittance 122 from funds of the payer and of the patient. The payment management system 102 maintains the database 114 that includes various tables and records that allow the payment management system 102 to quickly and efficiently process the payment instruction document 118 and direct the remittance 122 to the correct provider.

For example, the database 114 may include account tables 128, 130, 132, 134 that describe transactions to and balances of one or more accounts associated with the user 112. An HSA account table 128 includes records that describe deposits to and withdrawals from an HSA account of the user 112. The HSA account is an account that is used to store funds that are used to cover health care goods and/or services. In some examples, some HSA accounts comply with regulations that permit different tax or other regulatory treatment as compared to other financial accounts.

A premium account table 130 includes premium records 124 that describe premium payments made or to be made by the user 112. The example premium record 124 shown in FIG. 1 includes a payment amount field, a deduction amount field, and a premium adjustment field. When the premium record 124 describes a premium payment, the amount of the payment is indicated at the payment amount field. For example, the user 112 may make a premium payment, as described herein, utilizing the premium payment routine 140. When the premium record 124 describes a deduction, the amount of the deduction is indicated at the deduction amount field. For example, the payment management system 102 may initiate a deduction as part of a transfer to a provider account to cover a payer responsibility portion, as described herein. The premium adjustment field may be populated by the payment management system 102. For example, the payment management system 102 may determine that there is a deficit after all patient payment sources are considered. In response, the payment management system 102 may write an adjustment amount of a premium payment adjustment to cover the deficit to the premium adjustment field. A record having data for a premium adjustment field may be referred to herein as a premium adjustment record.

A prepayment account table 132 includes prepayment records 126 that describe prepayments made by the user 112. The example prepayment record 126 shown in FIG. 1 includes a date field, an amount field, a provider identification field, and a provider/patient identification field. The date field indicates the date on which the health care goods and/or services associated with the prepayment are delivered or performed. The amount field indicates an amount of the prepayment. The provider identification field indicates an identifier of the provider that provides the health care goods and/or services associated with the prepayment. The provider/patient identification field includes an identifier associated with a combination of the provider and the user 112.

A personal account table 134 includes records that describe deposits to and/or withdrawals from one or more personal accounts of the user 112, such as demand deposit accounts, savings accounts, credit accounts such as credit cards, etc. In some examples, the user 112 may have more than one personal account. In some examples, different personal accounts are described by different personal account tables 134.

The database 114 also includes a patient payment record 136. The patient payment record 136 may be stored separately and/or as part of a table including patient payment records 136 for different patient/users. The patient payment record 136 indicates a hierarchy of patient payment sources, abbreviated as "PT PMT SRC 1" through "PT MPT SRC N" in FIG. 1. The hierarchy of patient payment sources identifies payment sources for satisfying a patient responsibility portion of a payment amount to a provider. In the example of FIG. 1, the hierarchy of patient payment sources first looks to the prepayment account, then to an HSA account, and then to one or more personal accounts.

The database 114 also includes a patient/provider identification table 138 for the user 112. The patient/provider identification table 138 includes records that describe patient/provider identifiers that may be used, for example, to uniquely identify a combination of a provider and the user 112.

Figure 2:
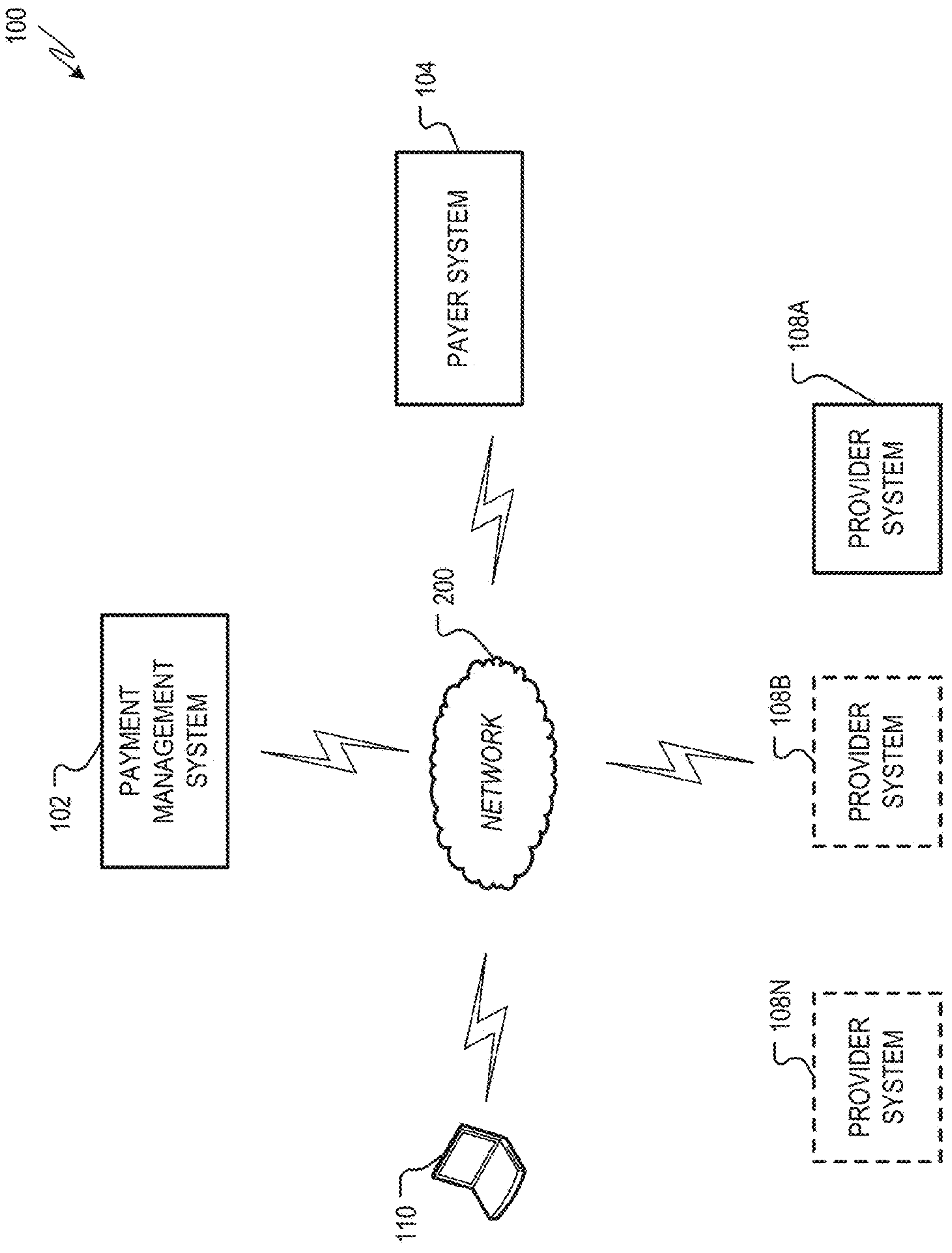
FIG. 2 is a diagram showing another example of the environment including additional details.

FIG. 2 is a diagram showing another example of the environment 100 including additional details. In the example of FIG. 2, the user computing device 110, payment management system 102, payer system 104, and provider systems 108A, 108B, 108N are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks, etc.

Figure 3:
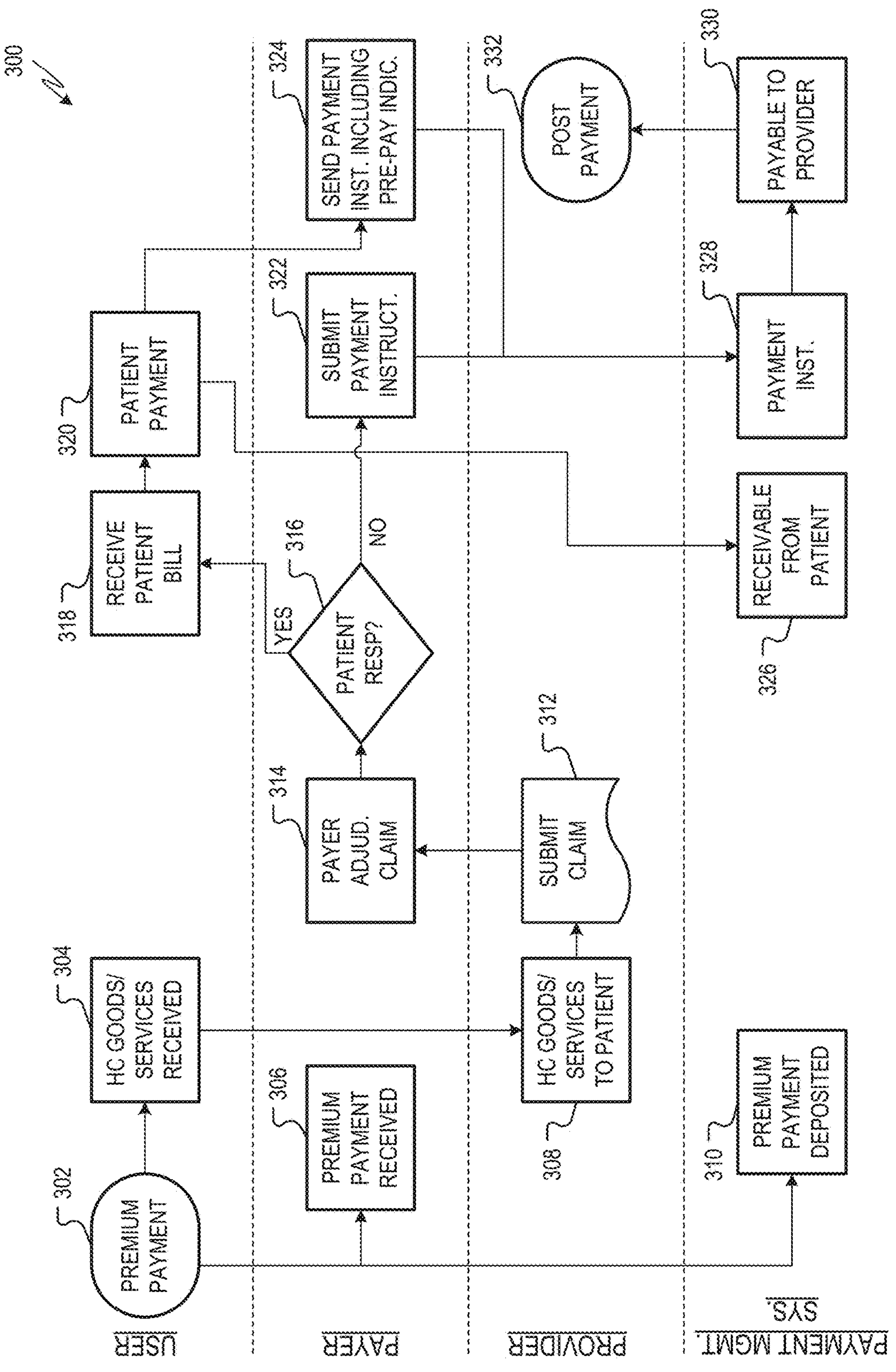
FIG. 3 is a flow chart showing one example workflow for processing a claim for health care goods or services.

FIG. 3 is a flow chart showing one example workflow 300 for processing a claim for health care goods or services. The flow chart 300 includes a user row indicating actions of the user 112, a payer row indicating actions of the payer system 104, a provider row indicating actions of the provider system 108A, and a payment management system row indicating actions of the payment management system 102.

At operation 302, the user 112 makes a premium payment from the user 112, for example, utilizing the premium payment routine 140 of the UI 106. The premium payment, in some examples, is made to a financial institution, such as a financial institution associated with the payment management system 102. The payment management system deposits the premium payment at operation 310. The premium payment may be deposited to the premium account. The premium account and/or the deposit itself may be associated with the user. In some examples, the payment management system also posts a payable to an account of the payer indicating that the premium payment is owed to the payer. For example, the payer may be the owner of funds in the premium account and may receive interest on its balance. The payable may later by removed or amended, for example, when the premium payment is used to cover all or part of the payer responsibility portion of a payment to a provider.

At operation 304, the user 112 (or another person covered under the user's health care insurance policy) receives health care goods and/or services from a provider (e.g., a provider associated with the provider system 108A). The provider (e.g., associated with the provider system 108A) provides the heath care goods and/or services at operation 308. At operation 312, the provider system 108A submits the claim document 116 to the payer system 104.

The payer system 104 adjudicates the claim indicated by the claim document 116 at operation 314. For example, the payer system 104 determines a payment amount, a payer responsibility portion of the payment amount, and a patient responsibility portion of the payment amount. These may be determined, for example, based on the user's health insurance policy with the payer. In some examples, the policy calls for the user 112 to meet a deductible before the payer is responsible for any of the payment amount. In some examples, a co-insurance term of the policy calls for the user 112 to cover a portion of the payment after the deductible is met. In some examples, the policy specifies a co-pay amount for which the user 112 is responsible. Accordingly, depending on the terms of the policy, the payer may be responsible for the full payment amount or the user 112 may be responsible for the full payment amount.

The payer system 104 determines, at operation 316, whether there is a patient responsibility portion of the payment amount. If yes, the payer system 104 bills the user 112, who receives the bill at operation 318. The user 112 pays the bill at operation 320, for example, using the prepayment routine 144 of the UI 106. In some examples, the payment at operation 320 is made to the prepayment account managed by the payment management system 102. The payment management system 102 may send the prepayment message 120 to the payer system 104 indicating the payment. At operation 324, the payer system 104 sends to the payment management system 102 a payment instruction, such as the payment instruction document 118, including an indication of the prepayment made by the user 112.

Referring back to operation 316, if there is no patient responsibility portion of the payment amount, the payer system 104 sends a payment instruction to the payment management system 102 at operation 322. The payment instruction sent at operation 322, which may include the payment instruction document 118, may indicate the payment amount and that the payer responsibility portion is equal to the payment amount.

The payment management system 102 receives the payment instruction at operation 328. At operation 330, the payment management system 102 transfers the payment amount to the provider, for example, from payer and/or user 112 sources, as described herein. The provider receives the payment at operation 332.

Figure 4:
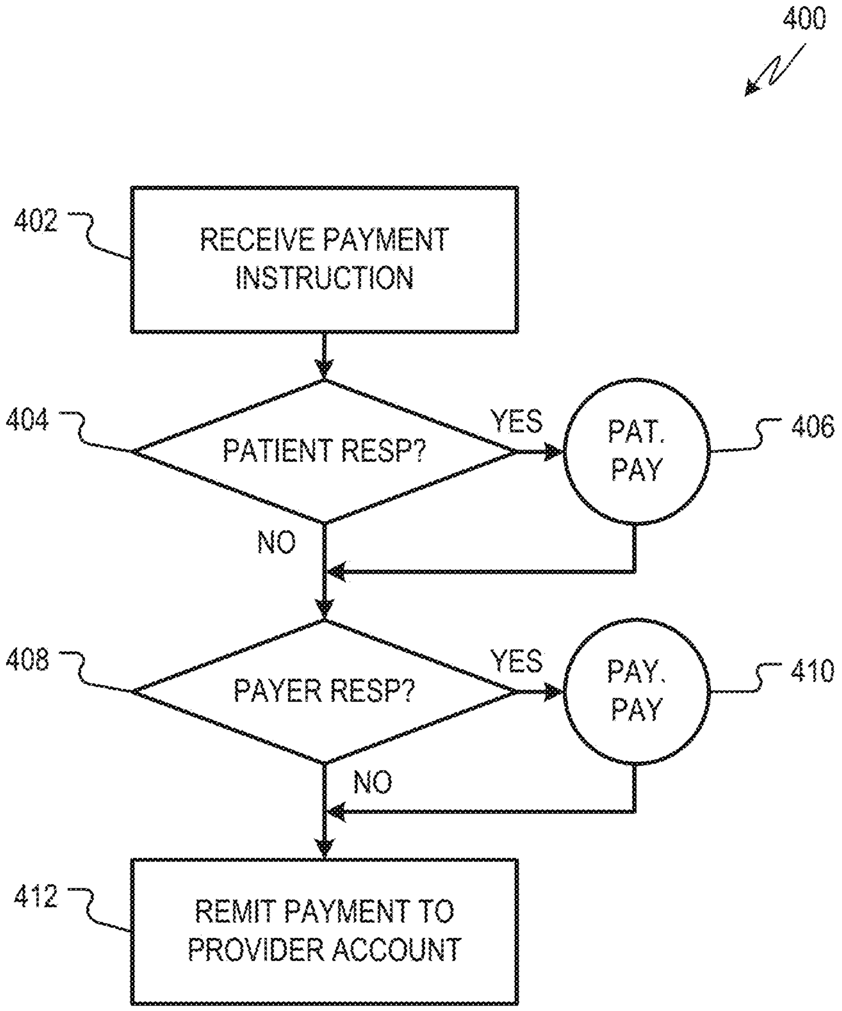
FIG. 4 is a flow chart showing one example of a process flow that may be executed by a payment management system to execute a payment instruction.

FIG. 4 is a flow chart showing one example of a process flow 400 that may be executed by the payment management system 102 to execute a payment instruction. At operation 402, the payment management system 102 receives a payment instruction, such as the payment instruction document 118. At operation 404, the payment management system 102 determines if the payment instruction received at operation 402 indicates a patient responsibility portion. If yes, the payment management system 102 executes a patient payment routine at operation 406. The patient payment routine determines which patient payment source or sources of the user 112 will be used to cover the patient responsibility portion of the payment amount.

If there is no patient responsibility portion, or after executing the patient payment routine, the payment management system 102 determines, at operation 408, whether the payment instruction received at operation 402 indicates a payer responsibility portion. If yes, the payment management system 102 executes a payer payment routine at operation 410. The payer payment routine returns one or more payer payment sources that are to be used to cover the payer responsibility portion of the payment amount. If there is no payer responsibility portion, or after executing the payer payment routine, the payment management system 102, at operation 412, remits the payment amount to the provider, for example, from the payment sources identified at operation 406 and/or at operation 410.

Figure 5:
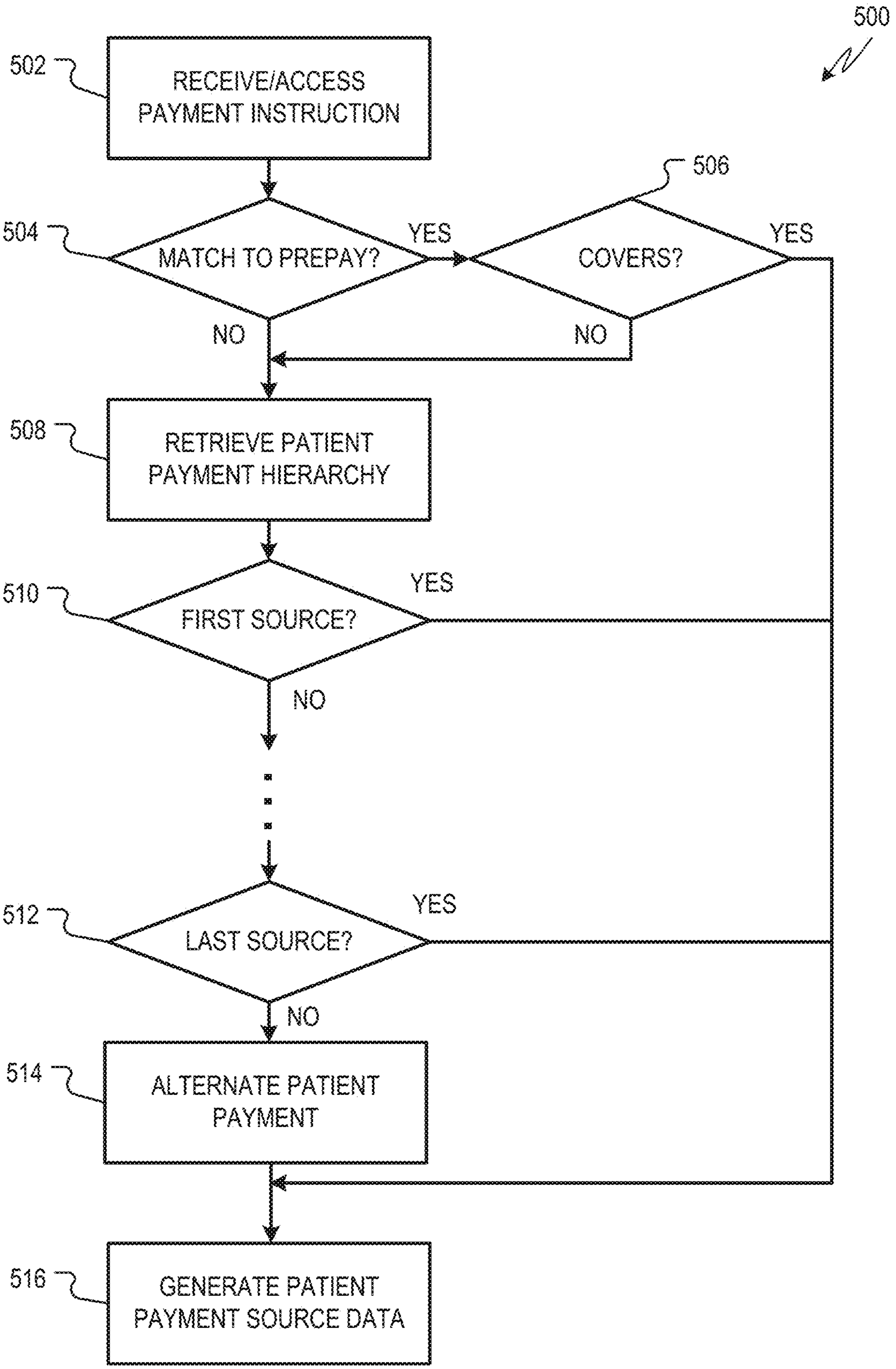
FIG. 5 is a flow chart showing one example of a process flow that may be executed by the payment management system to select one or more patient payment sources of a user for covering a patient responsibility portion of a payment to a provider.

FIG. 5 is a flow chart showing one example of a process flow 500 that may be executed by the payment management system 102 to select one or more patient payment sources of the user 112 for covering a patient responsibility amount of a payment to a provider. The process flow 500 shows one example way that the payment management system 102 may execute the patient payment routine at operation 406 of FIG. 4.

At operation 502, the payment management system 102 receives and/or accesses transaction description data from the payment instruction. The transaction description data may include the payment amount, the patient and/or payer responsibility, a payer identification, a patient/payer identification, etc. For example, the transaction description may be or include the payment instruction. At operation 504, the payment management system 102 determines if it is able to match the transaction description data to a prepayment made by the user 112. For example, the payment management system 102 may examine data indicated by the transaction description data, such as the provider (e.g., a provider identification), the user 112, or a provider/patient ID indicated by the transaction description data, and attempt to match the data to a prepayment. For example, the payment management system 102 may match some or all of the transaction description data to a prepayment record at the prepayment account table 132. If a match is found, the payment management system 102 determines, at operation 506, if the prepayment covers the patient responsibility portion. If yes, the payment management system 102 generates patient payment source data at operation 516, where the patient payment source data indicates that the entire patient responsibility portion will be covered from the prepayment.

If the prepayment does not cover the patient responsibility portion, or if no prepayment match is found at operation 504, the payment management system 102, at operation 508, retrieves a hierarchy of patient payment sources, such as the patient payment record 136. The hierarchy of patient payment sources indicates a hierarchy of patient payment sources for covering the patient responsibility portion. In some examples, instead of the payment management system 102 searching for a prepayment before accessing the hierarchy of patient payment sources, the prepayment account is simply listed as an entry (e.g., the first entry) in the hierarchy of patient payment sources.

At operation 510, the payment management system 102 determines if the first source listed at the hierarchy of patient payment sources covers a remainder of the patient responsibility portion. The remainder is the portion that is not covered by the prepayment, if any. If the first source covers the remainder, then the payment management system 102 generates patient payment source data at operation 516, which may indicate the prepayment (if any) and the first payment source.

If the first source does not cover the remainder at operation 510, the payment management system 102 proceeds through the patient payment sources indicated by the hierarchy of patient payment sources in a manner similar to that described with respect to operation 510. If the remainder is not covered by one or more sources before the last source, the payment management system 102 determines, at operation 512, whether the last patient payment source indicated by the hierarchy of patient payment sources covers the remainder portion. If yes, patient payment data is generated at operation 516. If not, the payment management system 102 implements an alternative patient payment to cover the remainder of the patient responsibility portion of the payment amount at operation 514. An example of implementing an alternative patient payment includes prompting the user 112 to make a patient payment via the UI 106. Another example of implementing the alternative patient payment includes adjusting one or more future premium payments of the user 112 to cover the remainder. This may include writing a record to the premium account table 130 indicating that the user's premium should be adjusted to cover the remainder over one or more future premium payments.

Figure 6:
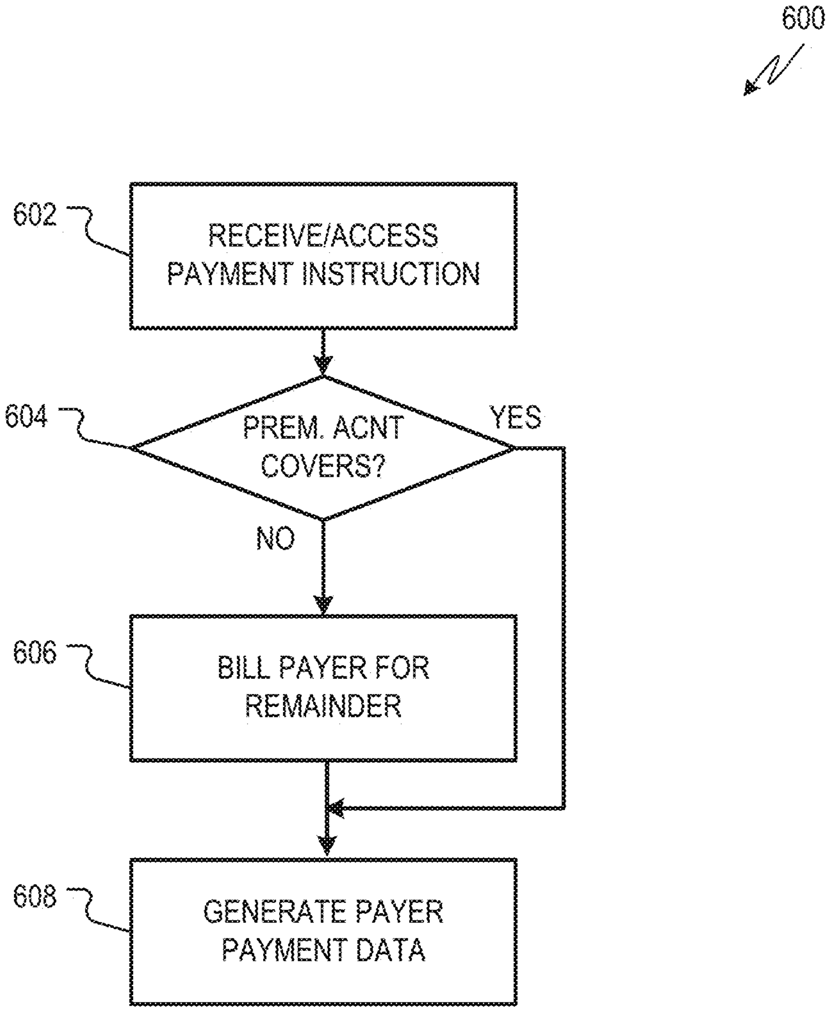
FIG. 6 is a flow chart showing one example of a process flow that may be executed by the payment management system to select one or more payer payment sources for covering a payer responsibility portion of a payment to a provider.

FIG. 6 is a flow chart showing one example of a process flow 600 that may be executed by the payment management system 102 to select one or more payer payment sources for covering a payer responsibility portion of a payment to a provider. For example, the process flow 600 shows one example way that the payment management system 102 may execute the payer payment routine at operation 410 of the process flow 400.

At operation 602, the payment management system 102 receives and/or accesses the payment instruction. At operation 604, the payment management system 102 determines if the premium account of the user 112 has a balance sufficient to cover the payer responsibility portion. For example, the payment management system 102 may access a premium account table 130 for the user 112. If the premium account covers the payer responsibility portion, the payment management system 102 generates payer payment data at operation 608. (E.g., the payer payment data may indicate that the entire payer responsibility portion is to be drawn from the user's premium account.) If the premium account does not cover the payer responsibility portion, the payment management system 102 bills the payer for the remainder at operation 606. The payment management system 102 may bill the payer, for example, by transferring the remainder from an account associated with the payer. The payment management system 102 may generate payer payment data at operation 608. (E.g., the payer payment data may indicate that some or all of the payer responsibility portion is covered by the billing at operation 606 and may also indicate that some of the payer responsibility portion is covered by the premium account.)

Figure 7:
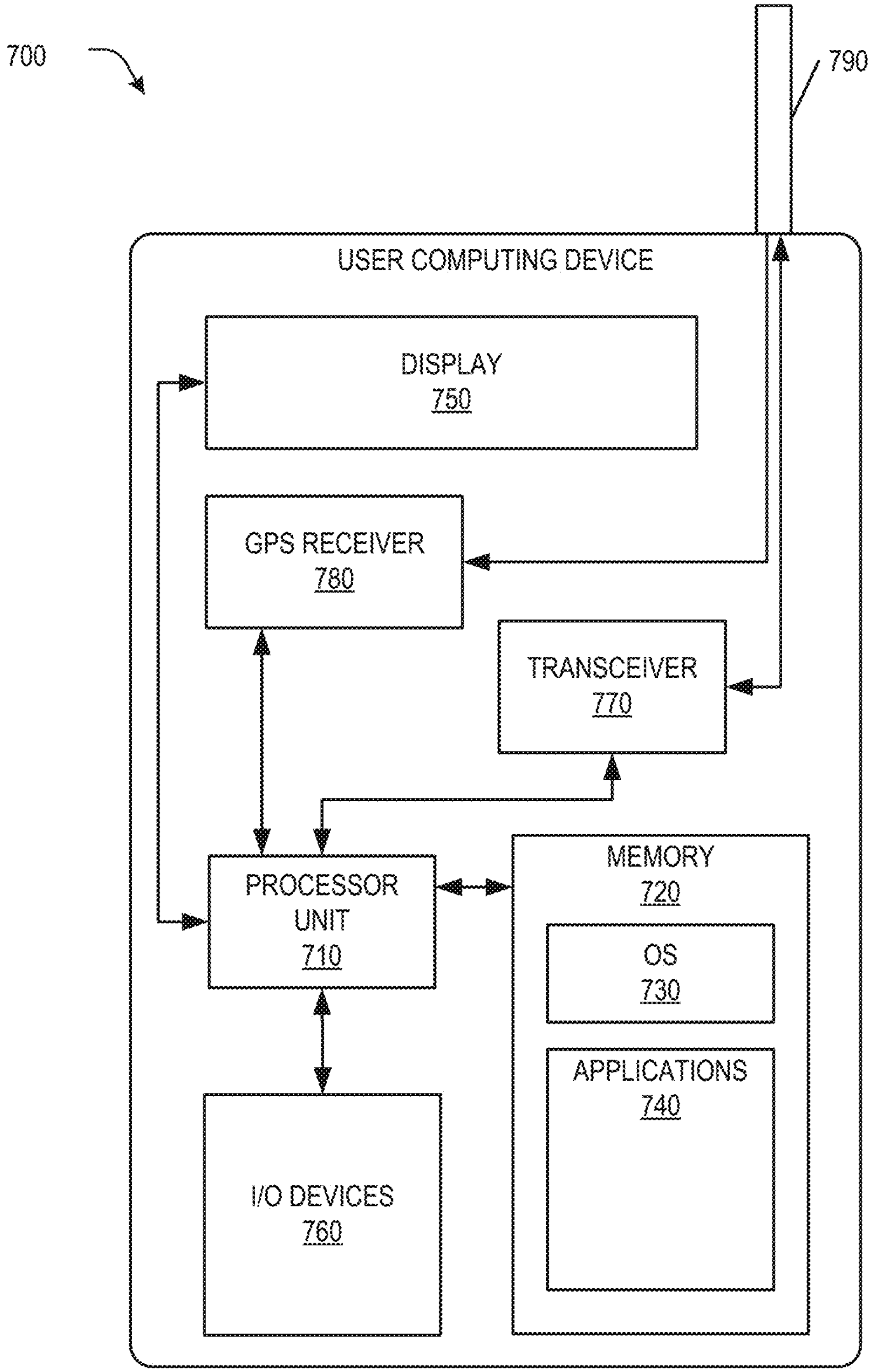
FIG. 7 is a block diagram showing an example architecture of a user computing device.

FIG. 7 is a block diagram showing an example architecture 700 of a user computing device. The architecture 700 may, for example, describe any of the computing devices described herein, including, for example, the user computing device 110. The architecture 700 comprises a processor unit 710. The processor unit 710 may include one or more processors. Any of a variety of different types of commercially available processors suitable for computing devices may be used (for example, an XScale architecture microprocessor, a Microprocessor without Interlocked Pipeline Stages (MIPS) architecture processor, or another type of processor). A memory 720, such as a Random Access Memory (RAM), a flash memory, or another type of memory or data storage, is typically accessible to the processor unit 710. The memory 720 may be adapted to store an operating system (OS) 730, as well as application programs 740.

The processor unit 710 may be coupled, either directly or via appropriate intermediary hardware, to a display 750 and to one or more input/output (I/O) devices 760, such as a keypad, a touch panel sensor, a microphone, and the like. Such I/O devices 760 may include a touch sensor for capturing fingerprint data, a camera for capturing one or more images of the user, a retina scanner, or any other suitable devices. In some examples, the I/O devices 760 may also include sensors.

Similarly, in some examples, the processor unit 710 may be coupled to a transceiver 770 that interfaces with an antenna 790. The transceiver 770 may be configured to both transmit and receive cellular network signals, wireless data signals, or other types of signals via the antenna 790, depending on the nature of the computing device implemented by the architecture 700. Although one transceiver 770 is shown, in some examples, the architecture 700 includes additional transceivers. For example, a wireless transceiver may be utilized to communicate according to an IEEE 702.11 specification, such as Wi-Fi and/or a short-range communication medium. Some short-range communication mediums, such as near-field communication (NFC), may utilize a separate, dedicated transceiver. Further, in some configurations, a Global Positioning System (GPS) receiver 780 may also make use of the antenna 790 to receive GPS signals. In addition to or instead of the GPS receiver 780, any suitable location-determining sensor may be included and/or used, including, for example, a Wi-Fi positioning system. In some examples, the architecture 700 (e.g., the processor unit 710) may also support a hardware interrupt. In response to a hardware interrupt, the processor unit 710 may pause its processing and execute an interrupt service routine (ISR).

Figure 8:
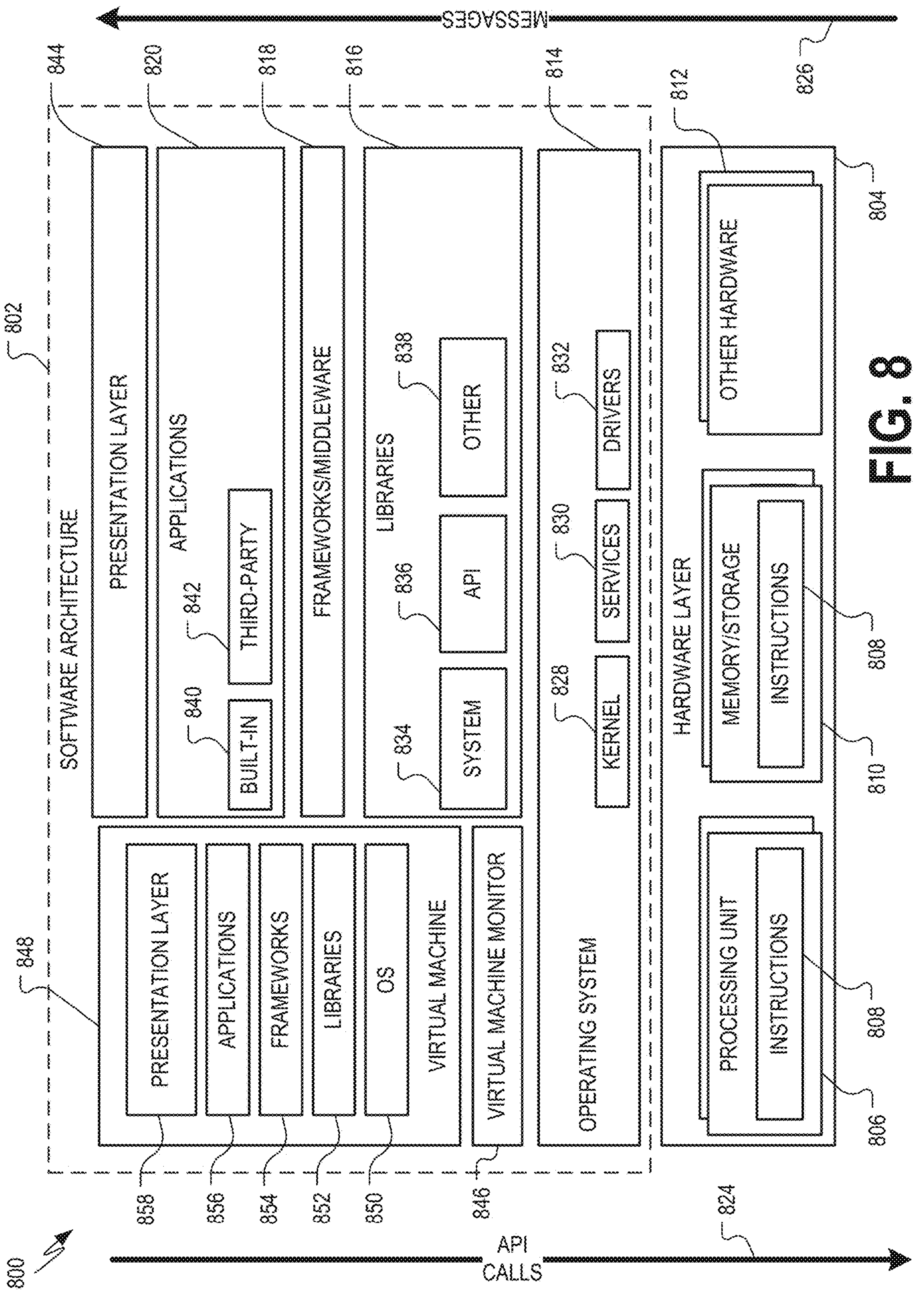
FIG. 8 is a block diagram showing one example of a software architecture for a computing device.

FIG. 8 is a block diagram 800 showing one example of a software architecture 802 for a computing device. The software architecture 802 may be used in conjunction with various hardware architectures, for example, as described herein. FIG. 8 is merely a non-limiting example of a software architecture 802, and many other architectures may be implemented to facilitate the functionality described herein. A representative hardware layer 804 is illustrated and can represent, for example, any of the above-referenced computing devices. In some examples, the hardware layer 804 may be implemented according to an architecture 900 of FIG. 9 and/or the architecture 700 of FIG. 7.

The representative hardware layer 804 comprises one or more processing units 806 having associated executable instructions 808. The executable instructions 808 represent the executable instructions of the software architecture 802, including implementation of the methods, modules, components, and so forth of FIGS. 1-6. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the architecture 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated are representative in nature and not all software architectures have all layers. For example, some mobile or special-purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of a hardware or software interrupt and, in response, cause the software architecture 802 to pause its current processing and execute an ISR when an interrupt is received. The ISR may generate an alert.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphical user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. The third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 842 may invoke the API calls 824 provided by the mobile operating system such as the operating system 814 to facilitate functionality described herein.

The applications 820 may utilize built-in operating system functions (e.g., kernel 828, services 830, and/or drivers 832), libraries (e.g., system libraries 834, API libraries 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 8, this is illustrated by a virtual machine 848. A virtual machine creates a software environment where applications/modules can execute as if they were executing on a hardware computing device. The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Figure 9:
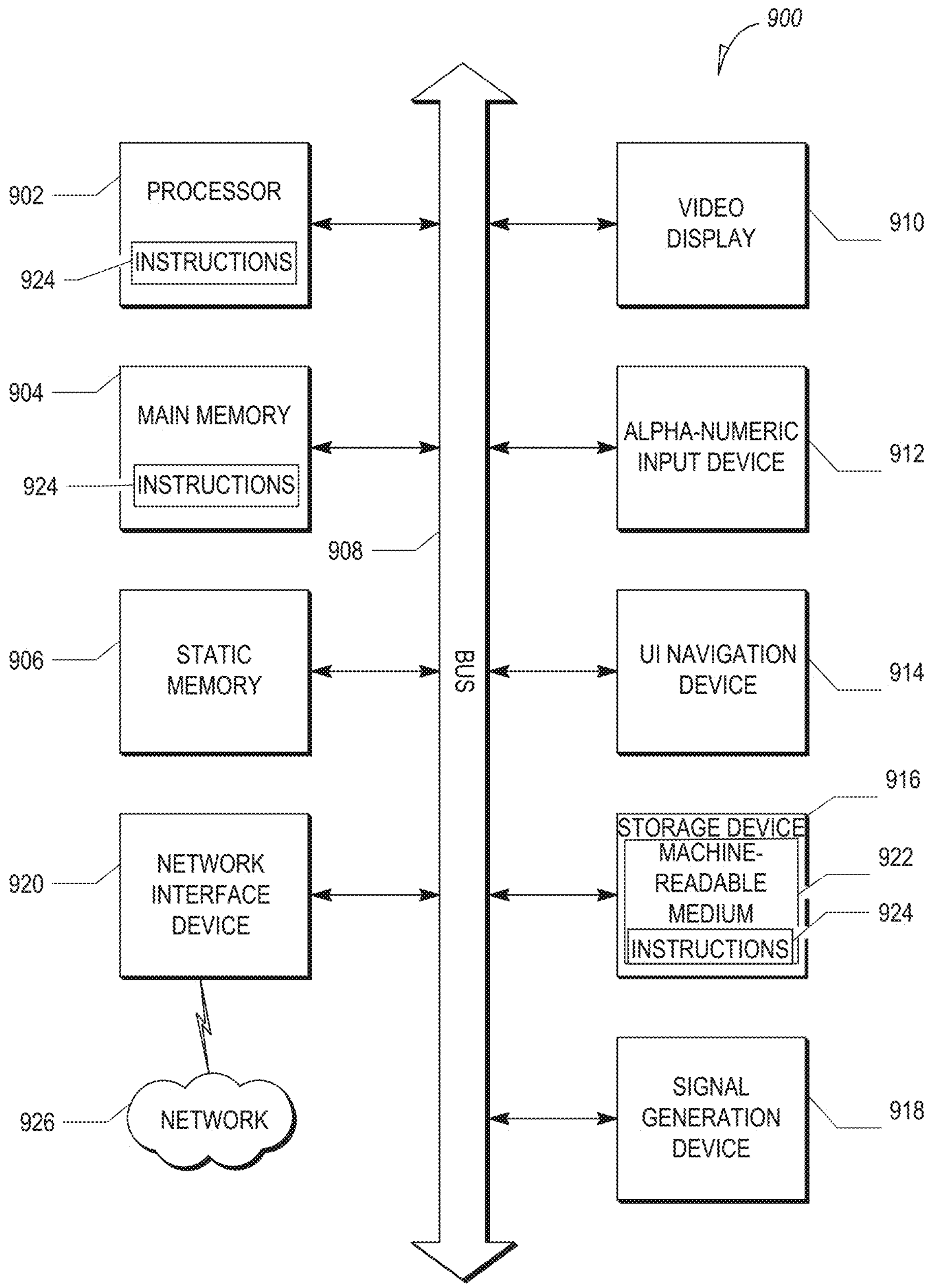
FIG. 9 is a block diagram illustrating a computing device hardware architecture, within which a set or sequence of instructions can be executed to cause a machine to perform examples of any one or more of the methodologies discussed herein.

FIG. 9 is a block diagram illustrating a computing device hardware architecture 900, within which a set or sequence of instructions can be executed to cause a machine to perform examples of any one or more of the methodologies discussed herein. The architecture 900 may describe, for example, any of the computing devices described herein including, for example, the user computing device 110, the payment management system 102, the payer system 104, and/or the provider systems 108A, 108B, 108N. The architecture 900 may execute the software architecture 802 described with respect to FIG. 8. The architecture 900 may operate as a standalone device or may be connected (e.g., networked) to other machines. In a networked deployment, the architecture 900 may operate in the capacity of either a server or a client machine in server-client network environments, or it may act as a peer machine in peer-to-peer (or distributed) network environments. The architecture 900 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 900 includes a processor unit 902 comprising at least one processor (e.g., a central processing unit (CPU), a graphics processing unit (GPU), or both, processor cores, compute nodes, etc.). The architecture 900 may further comprise a main memory 904 and a static memory 906, which communicate with each other via a link 908 (e.g., a bus). The architecture 900 can further include a video display unit 910, an alphanumeric input device 912 (e.g., a keyboard), and a UI navigation device 914 (e.g., a mouse). In some examples, the video display unit 910, alphanumeric input device 912, and UI navigation device 914 are incorporated into a touchscreen display. The architecture 900 may additionally include a storage device 916 (e.g., a drive unit), a signal generation device 918 (e.g., a speaker), a network interface device 920, and one or more sensors (not shown), such as a GPS sensor, compass, accelerometer, or other sensor.

In some examples, the processor unit 902 or another suitable hardware component may support a hardware interrupt. In response to a hardware interrupt, the processor unit 902 may pause its processing and execute an ISR, for example, as described herein.

The storage device 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904, within the static memory 906, and/or within the processor unit 902 during execution thereof by the architecture 900, with the main memory 904, the static memory 906, and the processor unit 902 also constituting machine-readable media. The instructions 924 stored at the machine-readable medium 922 may include, for example, instructions for implementing the software architecture 802, instructions for executing any of the features described herein, etc.

While the machine-readable medium 922 is illustrated in an example to be a single medium, the term "machine-readable medium" can include a single medium or multiple media (e.g., a centralized or distributed database, and/or associated caches and servers) that store the one or more instructions 924. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A method of operating a computer, comprising:

receiving, by a payment management system comprising at least one processor and associated memory, a premium payment message from a user computing device, the premium payment message describing a premium payment towards a health insurance policy held by a user of the user computing device, the premium payment message being received from a payment routine executing at the user computing device;

initiating, by the payment management system, a deposit of the premium payment to a premium account associated with the user;

receiving, by the payment management system, a payment instruction from a payer system of a payer associated with the health insurance policy, the payment instruction comprising payment amount data describing a payment amount owed to a provider;

determining, by the payment routine executing at the user computing device, that the user computing device is located at a facility of the provider using a sensor of the user computing device;

responsive to determining that the user computing device is located at the facility of the provider, generating, by the payment routine, a prompt to the user at a display of the user computing device, the prompt requesting a prepayment by the user towards a first portion of the payment amount, the first portion of the payment amount to be covered by the user;

receiving, by the payment management system and from the payment routine, a prepayment message describing the prepayment made by the user towards the first portion of the payment amount;

based at least in part on a hierarchy of patient payment sources, selecting, by the payment management system, a first patient payment source;

initiating, by the payment management system, a withdrawal of a prepayment amount from the first patient payment source; and initiating, by the payment management system, a transfer of the payment amount to the provider, wherein at least a portion of the payment amount is transferred from the first patient payment source, at least a portion of the payment amount is transferred from the premium account, and the payment amount includes the prepayment amount.

2. The method of claim 1, the payment instruction further comprising transaction description data and a first portion data describing the first portion of the payment amount to be covered by the user and second portion data describing a second portion of the payment amount to be covered by the payer.

3. The method of claim 2, further comprising providing, by the payment routine and to the user, explanation of benefits data describing the payment amount, the first portion of the payment amount to be covered by the user, and the second portion of the payment amount to be covered by the payer, the explanation of benefits data being provided via a user interface using an output device of the user computing device.

4. The method of claim 1, further comprising serving, to the user computing device, code for executing the payment routine, the code for executing the payment routine comprising code for providing a user interface at the user computing device.

5. The method of claim 1, the initiating of the deposit of the premium payment to the premium account associated with the user comprising writing a premium record to a premium account table at a payment management system database, the premium record comprising an indication of the user, and an indication of an amount of the premium payment.

6. The method of claim 1, further comprising accessing a patient payment record stored at a payment management system database, the patient payment record describing the hierarchy of patient payment sources.

7. The method of claim 1, further comprising writing, by the payment management system, a prepayment record to a prepayment database table associated with the user, the prepayment database table stored at a payment management system database, wherein the prepayment record comprises prepayment amount data describing a prepayment amount of the prepayment, and provider data describing the provider.

8. The method of claim 7, further comprising matching, by the payment management system, the prepayment record to transaction description data, the payment instruction comprising the transaction description data.

9. The method of claim 8, the payment instruction further comprising prepayment description data identifying at least a portion of the prepayment record.

10. The method of claim 1, further comprising:

determining, by the payment management system, that an available balance of the first patient payment source is less than the first portion of the payment amount; and based at least in part on the hierarchy of patient payment sources, selecting, by the payment management system, a second patient payment source, wherein at least a portion of the payment amount is transferred from the second patient payment source.

11. The method of claim 1, further comprising:

determining, by the payment management system, that an available balance of the first patient payment source is less than the first portion of the payment amount by a deficit amount;

writing, by the payment management system, a record indicating the user and the deficit amount; and sending, by the payment management system, to the user a premium payment notice indicating that the premium payment is due and an adjustment amount based at least in part on the deficit amount.

12. A computing system, comprising:

a payment management system and a user computing device in communication with the payment management system, the computing system being programmed to perform operations comprising:

receiving, by the payment management system and from the user computing device, a premium payment message, the premium payment message describing a premium payment towards a health insurance policy held by a user of the user computing device, the premium payment message being received from a payment routine executing at the user computing device;

initiating, by the payment management system, a deposit of the premium payment to a premium account associated with the user;

receiving, by the payment management system, a payment instruction from a payer system of a payer associated with the health insurance policy, the payment instruction comprising payment amount data describing a payment amount owed to a provider;

determining, by the payment routine executing at the user computing device, that the user computing device is located at a facility of the provider using a sensor of the user computing device;

responsive to determining that the user computing device is located at the facility of the provider, generating, by the payment routine, a prompt to the user at a display of the user computing device, the prompt requesting a prepayment by the user towards a first portion of a payment amount, the first portion of the payment amount to be covered by the user;

receiving, by the payment management system and from the payment routine, a prepayment message describing the prepayment made by the user towards the first portion of the payment amount;

based at least in part on a hierarchy of patient payment sources, selecting, by the payment management system, a first patient payment source;

initiating, by the payment management system, a withdrawal of a prepayment amount from the first patient payment source; and initiating, by the payment management system, a transfer of the payment amount to the provider, wherein at least a portion of the payment amount is transferred from the first patient payment source, at least a portion of the payment amount is transferred from the premium account, and the payment amount includes the prepayment amount.

13. The computing system of claim 12, the payment instruction further comprising transaction description data and a first portion data describing the first portion of the payment amount to be covered by the user and second portion data describing a second portion of the payment amount to be covered by the payer.

14. The computing system of claim 13, the operations further comprising providing, by the payment routine and to the user, explanation of benefits data describing the payment amount, the first portion of the payment amount to be covered by the user, and the second portion of the payment amount to be covered by the payer, the explanation of benefits data being provided via a user interface using an output device of the user computing device.

15. The computing system of claim 12, the operations further comprising serving, to the user computing device, code for executing the payment routine, the code for executing the payment routine comprising code for providing a user interface at the user computing device.

16. The computing system of claim 12, the initiating of the deposit of the premium payment to the premium account associated with the user comprising writing a premium record to a premium account table at a payment management system database, the premium record comprising an indication of the user, and an indication of an amount of the premium payment.

17. The computing system of claim 12, the operations further comprising accessing a patient payment record stored at a payment management system database, the patient payment record describing the hierarchy of patient payment sources.

18. The computing system of claim 12, the operations further comprising writing, by the payment management system, a prepayment record to a prepayment database table associated with the user, the prepayment database table stored at a payment management system database, wherein the prepayment record comprises prepayment amount data describing a prepayment amount of the prepayment, and provider data describing the provider.

19. The computing system of claim 18, the operations further comprising matching, by the payment management system, the prepayment record to transaction description data, the payment instruction comprising the transaction description data.

20. At least one non-transitory machine-readable medium comprising instructions thereon that, when executed by at least one processor, cause the at least one processor to perform operations comprising:

receiving, by a payment management system, a premium payment message from a user computing device, the premium payment message describing a premium payment towards a health insurance policy held by a user of the user computing device, the premium payment message being received from a payment routine executing at the user computing device;

initiating, by the payment management system, a deposit of the premium payment to a premium account associated with the user;

receiving, by the payment management system, a payment instruction from a payer system of a payer associated with the health insurance policy, the payment instruction comprising payment amount data describing a payment amount owed to a provider;

determining, by the payment routine executing at the user computing device, that the user computing device is located at a facility of the provider using a sensor of the user computing device;

responsive to determining that the user computing device is located at the facility of the provider, generating, by the payment routine, a prompt to the user at a display of the user computing device, the prompt requesting a prepayment by the user towards a first portion of the payment amount, the first portion of the payment amount to be covered by the user;

receiving, by the payment management system and from the payment routine, a prepayment message describing the prepayment made by the user towards the first portion of the payment amount;

based at least in part on a hierarchy of patient payment sources, selecting, by the payment management system, a first patient payment source;

initiating, by the payment management system, a withdrawal of a prepayment amount from the first patient payment source; and initiating, by the payment management system, a transfer of the payment amount to the provider, wherein at least a portion of the payment amount is transferred from the first patient payment source, at least a portion of the payment amount is transferred from the premium account, and the payment amount includes the prepayment amount.

* * * * *